Jan. 26, 1943.            H. ASKEW                2,309,375
                     SELF OILING PICKER ROD
                      Filed July 11, 1942

INVENTOR
HENRY ASKEW
BY James H. Littlepage
ATTORNEY

Patented Jan. 26, 1943

2,309,375

UNITED STATES PATENT OFFICE 2,309,375

SELF-OILING PICKER ROD

Henry Askew, Chattanooga, Tenn.

Application July 11, 1942, Serial No. 450,591

10 Claims. (Cl. 139—158)

This invention relates to picker rods for looms and, more particularly, to a self-oiling, self-cleaning picker rod for use with either automatic or plain looms.

The primary object of this invention is to provide a picker rod of the type which is ordinarily fastened to the lay of a loom, and on which the picker reciprocates at an extremely high rate of speed, i. e.; about one hundred and twenty picks per minute, so as to strike the shuttle and cause it to run back and forth through the warp of the loom. It is therefore necessary to lubricate the bearing surface, which is comprised of the outer surface of the rod, in order to prevent burning out of the picker and stoppage of the loom, and it is herein intended to provide a self-oiling picker rod, the bearing surface of which will be maintained in the proper state of lubrication.

A further object of this invention is to provide a self oiling picker rod by which the picker rod is fed oil by the constant movement and agitation of the oil in the container. This avoids over lubrication and consequent dripping down of oil or splashing of oil onto the work.

Still again, it is intended to provide a lubricating system for a picker rod which, even though the oiled surface be constantly exposed to the lint and dust circulating in the air of a mill, will not be subject to clogging, gumming, or reduction of efficiency by lodging of foreign particles therein. More specifically, an object is to provide a lubricating system in which the exposed surfaces are cleaned out by the adjacent bearing surfaces of the picker itself, as the picker travels back and forth there-across.

In the structural embodiment of these objectives, it is an object to provide a hollow picker rod having an oil reservoir affixed to one end thereof and communicating with the bore of the hollow rod so as to feed oil through the interior thereof. Intermediate the ends of the rod, a shallow groove is formed in its periphery so as to extend diagonally of the length of the rod, and a relatively minute hole is drilled inwardly from the bottom of the groove to communicate with the bore. Further, it is intended to provide a substantially air-tight oil reservoir communicating with the bore of the rod only through a restricted orifice so that the only air entering the reservoir must be through the minute hole leading from the groove and passing through the bore of the picker rod. Thus, when the loom is not operating, the rod and reservoir are stationary so that oil cannot escape from the reservoir and over-lubricate the loom, because of atmospheric pressure against the outlet but when the loom is operating, the rod and reservoir are rocked back and forth so that the oil therein will be agitated, whereby air bubbles may work their way into the reservoir and thus raise the pressure in the interior of the reservoir. Additionally, pressure increase and decrease is caused by the rapid sliding of the picker across the groove so that a breathing effect is provided, whereby positively to control the flow of oil into the groove.

These and other objectives will appear from the following specification and drawing, in which.

Figure 1:
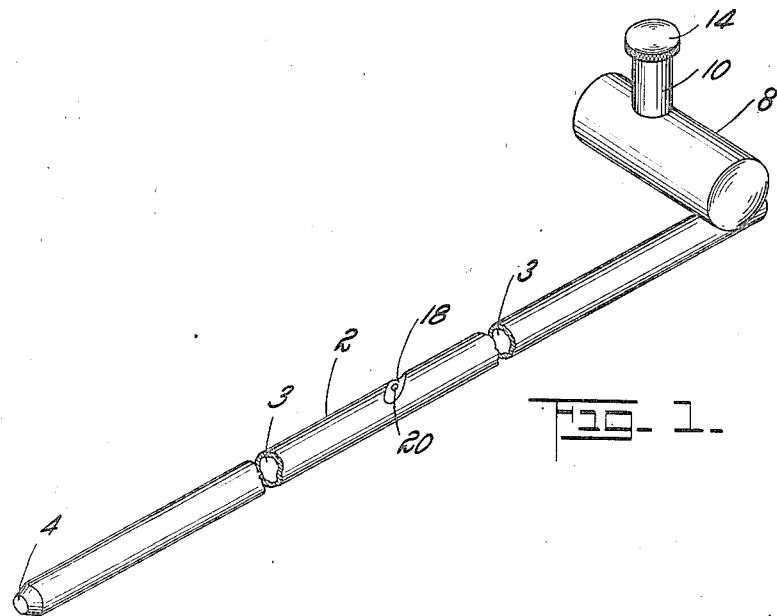
Fig. 1 is a perspective view showing the picker rod and oil reservoir.
Figure 2:
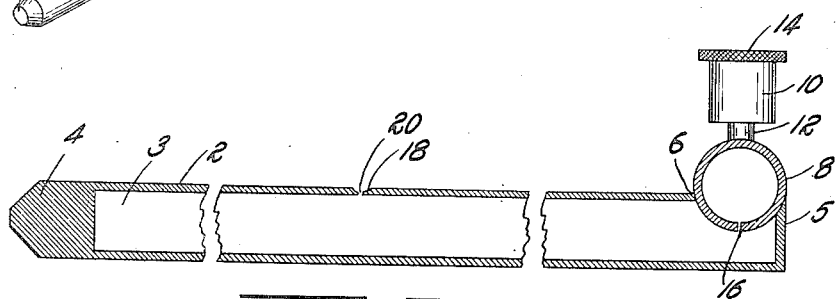
Fig. 2 is a longitudinal section through the device shown in Fig. 1, and, Fig. 3 is a side elevation of the assembly.

Referring now to the drawing, reference numeral 2 denotes a hollow, elongated picker rod having a hollow bore 3 and, a solid end 4 and a closed end 5. Adjacent closed end 5, the upper portion of the hollow rod is cut away, as indicated at 6, to seat an oil reservoir 8. Reservoir 8 comprises an elongated, horizontally disposed body, the main portion of which is preferably offset from the picker rod for reasons explained below. Air inlet fitting 10, which is connected to the oil reservoir by a hollow neck 12, is provided with an air-tight cap 12 so that, with the cap in place, the only communication with the exterior from the reservoir is through a restricted orifice 16 which leads into the bore 3 of hollow picker rod 2. In practice, it has been found best to have orifice 16 at about $\frac{1}{32}$ of an inch in diameter.

Intermediate the ends of hollow picker rod 2, a shallow diagonal groove 18 is cut and a hole 20 which, like orifice 16 is relatively small, is drilled through the side wall of the rod so as to connect the bore 3 of rod 2 with the atmosphere.

It should be noted that groove 18 is disposed diagonally across the path of a picker travelling back and forth along picker rod 2, the length of the groove from end to end, with respect to the longitudinal axis of the rod, preferably being such that the groove is entirely covered by the interior bearings of a picker at the instant when the picker passes thereover.

The operation of the device is as follows:

Bore 3 and reservoir 8, which is normally disposed slightly thereabove, are first filled with lubricating oil, but when the loom is not in operation oil within reservoir 10 will not leak out through restricted orifice 16 because of air-tight cap 14, and hence oil will not seep through opening 20 into groove 18. However, as the loom is placed into operation, the lay to which rod 2 is attached rocks, thus to agitate the oil within bore 3 and, simultaneously, to cause the oil within reservoir 8 to surge from end to end therein in accordance with the rocking motion of the loom, thereby tending to force out drops of oil through restricted orifice 16 as it surges towards the end secured to the picker, and tending to draw in available air as it surges away from that end.

Meanwhile the picker, each time it rushes back and forth along the rod 2, crosses and recrosses groove 18. With the start of each crossing of groove 18 by the picker, air is forced into the groove and through hole 20 into the agitated oil within the bore 3, and as the picker bearings, which slidably surround the exterior of rod 2, leave groove 18, a decrease in pressure within groove 18 to slightly below atmospheric pressure results, thereby drawing oil out from bore 3 through hole 20. As the oil within bore 3 becomes agitated and full of air bubbles, the air within the bubbles is drawn into reservoir 8 through orifice 16 as described above.

Figure 3:
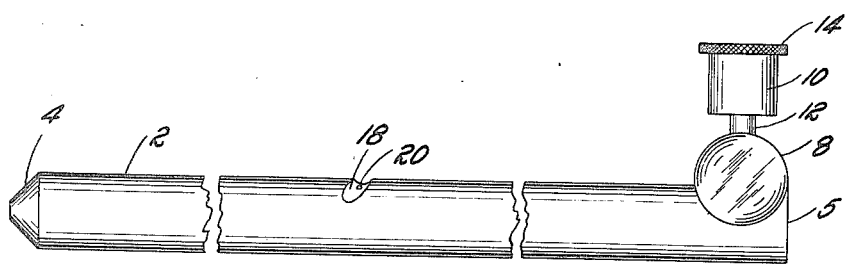

Self-cleaning of groove 18 is provided by movement of the picker thereacross, the movement of the picker forcing out the oil in groove 18 from the ends thereof. As the oil is forced out of one end or the other of groove 18, depending upon the direction of travel of the picker, any dust or line lodging in groove 18 is carried out by the oil and distributed over the surface of the rod below the end of the groove so that it will not be carried back into the groove on the return stroke of the picker. In Figs. 1 and 3 it will be seen that the ends of groove 18 merge substantially tangentially into the surface of rod 2, and that each end of the groove extends downwardly so that oil may flow freely therefrom.

It is to be understood that the invention is not to be limited to the exact structure shown, but is to be construed to cover all modifications and equivalents within the scope of the following claims.

I claim:

1. A device of the type described, comprising a hollow picker rod, and an oil supply reservoir communicating with the interior thereof, said rod having a diagonal groove in the exterior wall thereof and a hole connecting the bottom of said diagonal groove with said interior.

2. A device of the type described, comprising a hollow picker rod adapted to be supported on the lay of a loom, an oil supply reservoir for supplying oil to the bore of said rod, said rod having a groove in the upper surface thereof, said groove extending generally transverse to the longitudinal dimensions of said rod, and oil passage means through the wall of said rod between said groove and said bore.

3. The combination claimed in claim 2, said passage means comprising a hole relatively small with respect to the dimensions of said groove.

4. A device of the type described, comprising a hollow picker rod adapted to be supported on the lay of a loom, an oil reservoir for supplying oil to the bore of said rod, said rod having a shallow groove in the upper exterior surface thereof and a relatively small hole through the wall thereof between the bottom of said groove and said bore, said groove extending diagonally with respect to the longitudinal dimension of said rod.

5. A device as claimed in claim 4, the bottom of said groove at the ends thereof merging gradually with the exterior of said rod.

6. A device as claimed in claim 4, the bottom of said groove at the ends thereof extending downwardly on each side of said rod, whereby to allow oil to flow freely therefrom.

7. In combination, a hollow picker rod adapted to be supported on the lay of a loom, said rod having oil outlet means connecting the bore thereof with its outer surface intermediate the ends thereof, and an elongated oil reservoir extending transversely to said rod, one end of said oil reservoir being affixed to one end of said rod and having an orifice connecting the interior of said reservoir with said bore.

8. The combination claimed in claim 7, said oil outlet means comprising a shallow groove in the outer surface of said rod, extending diagonal to the length thereof, and a hole connecting said groove with said bore.

9. The combination claimed in claim 7, said oil outlet means comprising a shallow groove in the upper, exterior surface of said rod, said groove extending diagonal to the length of said rod, and a hole connecting said groove and said bore, said hole and said orifice being relatively small, said rod and said reservoir being otherwise closed.

10. In combination, a cylindrical picker rod adapted to be supported on the lay of a loom, said rod being hollow and closed at both ends, a shallow groove in the upper surface of said rod intermediate the ends thereof, said groove extending diagonal with respect to the longitudinal and transverse dimensions of said rod, the ends of said groove extending downwardly on each side of said rod, said rod having a restricted opening through the wall thereof extending vertically between the center of said groove and said bore, the upper portion of said rod being cut-away adjacent one end thereof, and an elongated, cylindrical oil reservoir extending transversely to said rod and having one end seated in said cut-away portion, said reservoir having a restricted orifice through its bottom connecting the interior thereof with said bore, said rod and said reservoir being otherwise closed.

HENRY ASKEW.